(12) United States Patent
Urschey et al.

(10) Patent No.: US 9,803,121 B2
(45) Date of Patent: Oct. 31, 2017

(54) USE OF A POLYMER DISPERSION AS DUST CONTROL AGENT

(71) Applicant: BK Giulini GMBH, Ludwigshafen (DE)

(72) Inventors: Michael Urschey, Krefeld (DE); Rudolf Lunkenheimer, Wackernheim (DE); Tim Stephan, Limburgerhof (DE)

(73) Assignee: KURITA WATER INDUSTRIES LTD., Tokyo (JP)

( * ) Notice: Subject to any disclaimer, the term of this patent is extended or adjusted under 35 U.S.C. 154(b) by 178 days.

(21) Appl. No.: 14/395,262

(22) PCT Filed: Apr. 12, 2013

(86) PCT No.: PCT/EP2013/001080
§ 371 (c)(1),
(2) Date: Oct. 17, 2014

(87) PCT Pub. No.: WO2013/156127
PCT Pub. Date: Oct. 24, 2013

(65) Prior Publication Data
US 2015/0060724 A1    Mar. 5, 2015

(30) Foreign Application Priority Data

Apr. 18, 2012 (DE) .................. 10 2012 007 827

(51) Int. Cl.
*C09K 3/22* (2006.01)
*C08F 251/00* (2006.01)

(52) U.S. Cl.
CPC ............. *C09K 3/22* (2013.01); *C08F 251/00* (2013.01)

(58) Field of Classification Search
None
See application file for complete search history.

(56) References Cited

U.S. PATENT DOCUMENTS

| 4,417,992 A | 11/1983 | Bhattacharyya et al. |
| 4,642,196 A | 2/1987 | Yan |
| 4,746,543 A | 5/1988 | Zinkan et al. |
| 4,780,233 A | 10/1988 | Roe |
| 4,897,218 A | 1/1990 | Roe |
| 5,194,174 A | 3/1993 | Roe et al. |
| 2011/0049417 A1 | 3/2011 | Swift et al. |

FOREIGN PATENT DOCUMENTS

| AU | 2007216657 A1 | 4/2008 |
| CN | 1390908 A | 1/2003 |
| CN | 101333431 A | 12/2008 |
| CN | 101497782 A | 8/2009 |
| CN | 101824303 A | 9/2010 |
| CN | 102093846 A | 6/2011 |
| CN | 102093847 A | 6/2011 |
| EP | 305621 A2 | 3/1989 |
| WO | WO-2009151316 A2 | 12/2009 |

OTHER PUBLICATIONS

International Search Report of PCT/EP2013/001080 filed Jun. 27, 2013 with English translation.

*Primary Examiner* — Necholus Ogden, Jr.
(74) *Attorney, Agent, or Firm* — Venable LLP; Keith G. Haddaway; Annette K. Kwok

(57) ABSTRACT

The present invention relates to the use of polymer dispersions for dust control, wherein these polymer dispersions can be obtained by radically initiated emulsion polymerisation of the components a to e: a. 2-75% by weight styrene and/or substituted styrene and b. 0 to 75% by weight acrylic acid C1-C2 ester and/or methacrylic acid C1 to C12 ester and c. 0 to 50% by weight acrylonitrile and/or methacrylonitrile and d. 0 to 50% by weight of at least one further copolymerisable ethylenically unsaturated monomers with one or more C—C double bonds in the presence of e. 10 to 7% by weight starch and/or modified starch and/or degraded starch and/or degrated modified starch wherein the polymerisation is carried out in water.

10 Claims, No Drawings

USE OF A POLYMER DISPERSION AS DUST CONTROL AGENT

The present invention relates to the use of polymeric dust control agents for reducing dust emissions when loading, storing, transporting, handling and using dusty solids of all types.

Among others, such solids include coal, coke, ores, metal dust, sand, soil, ash, minerals, sulfur, slags, fertilizers and certain types of garbage, such as bulky waste. Other goods, such as dusts during the production of coal, must be bound as rapidly as possible for environmental and health reasons, so that the dusts are not inhaled. For the same reasons, dust emissions from stockpiles or transporting surfaces must be avoided.

Basically, there are many types of organic and inorganic dusts, especially fine dusts, which are very harmful to health when inhaled (danger of silicosis, "black lung" and related symptoms). Quite generally, dust emissions are therefore to be avoided in the industrial and public environment.

In the prior art, there are many different solutions for binding dust and avoiding and controlling dust emissions.

One of the simplest means is to spray on water, which frequently is mixed with additives, such as water-soluble solvents, waxes or surfactants, for moistening the surface in order to bind the dust. However, residues from the distillation of crude oil, such as coal tar pitch, are also used.

Water alone is always active only until it has evaporated completely. It can therefore be used in arid climates only for a very short time.

In U.S. Pat. No. 4,417,992, liquid dispersions of aqueous consistency of highly branched, water-swellable polymers are used, which are based on acrylamide or on copolymers of acrylamide and acrylic acid, which are cross-linked with monomers, which contain more than one ethylenically unsaturated group. The polymers are present here as gel-like micro particles in oil phase consisting, for example, of paraffin oil or mineral oil.

In the U.S. Pat. No. 4,746,543, water-soluble anionic acrylic polymers are used for the same purpose in mixtures with water-soluble, nonionic polyalkylene glycols together with nonionic and anionic surfactants.

In EP 305 621 B1, a dust-binding material is described, consisting of water, which contains a thickening agent, such as starch or polyhydroxymethylcellulose, and coal tar pitch, which is dissolved in anthracene oil. Although such dispersion consolidates the surface, because of the aromatic solvent used it is extremely damaging to the environment and unacceptable.

In U.S. Pat. No. 5,194,174, it is proposed that a dust-controlling agent, consisting of polyvinyl alcohol and boric acid, be sprayed or foamed onto the surface of the respective dusts. Aside from plasticizers and cross-linking agents, this aqueous solution, which is not viscous, also contains humectants and foaming agents. However, the use of boric acid is no longer acceptable, because boric acid is a substance that has been placed on the list of substances of very high concern (SVHC) by the European Chemicals Agency ECHA.

In the fertilizer industry, waxes and special wax mixtures are used as binders for dust and to improve the flowability of granulates. At times, solid fertilizers tend to form much dust. Waxes can contribute to minimizing dust pollution and the losses of fine particles. Additives to increase flowability are necessary, since some solid fertilizers tend to cake because of their hygroscopic properties. Special wax mixtures can offer the technical solutions here when there are problems with processing, storing and also measuring out.

Coating materials are described in WO 2009151316 for covering the surface of bulk materials and thereby consolidating them. The compounds used here consist of the residues from distilling biodiesel, methyl or ethyl esters of natural fatty acids and related products such as glycerol ester, but also of residues of the distillation processes of fatty acids, fatty alcohols, fatty amines and fatty amides. According to claim 1, these products can be combined in the general formula $((FA)_p\text{-}X))_q$, in which FA is a saturated or unsaturated $C_8$-$C_{24}$ fatty alkyl, with 0 to 5 and preferably 0 to 3 C=C groups in the chain, X is a group selected from —C(O)OH, —C(O)OR, —NH$_2$—, NHC(O)R$^1$, NHC(O)OH, —OH, —COR and p=1 to 1000, preferably 1 to 3 and q=1 to 1000, preferably 2 to 5, with the proviso that p and q are not 1 simultaneously, R is a short-chain alkyl group and R$^1$ is H or a short-chain alkyl group.

Among other compounds, phosphate esters, polymers of 1,4 unsaturated C4 to C14 carboxylic acids or anhydrides, such as maleic acid, maleic anhydride, itaconic acid and citraconic acid belong to this group.

Surfactant-containing, foam-producing anti-dusting agents are also described in U.S. Pat. Nos. 0,478,0233 and 4,897,218. These agents basically have the disadvantage that the surfactants, being water soluble, are flushed into the groundwater by rain and, thereby, become harmful to the environment. This is so especially for agents which contain nonylphenol ethoxylates.

The AU 2007216657 describes the use of fluorine-containing polymers, especially of polytetrafluoroethylene (PTFE). Such fluoropolymers are extremely difficult to break down, persist in and may cause lasting damage to the environment. These agents therefore are absolutely unacceptable.

For the purpose of binding dust on stockpiled coal, the patent CN 101824303 A describes a polymer, which contains acrylic acid and methylene-bis-acrylamide and is produced in the presence of starch. This agent is sprayed as an aqueous solution onto the stockpiled coal with the help of spraying equipment.

In CN 101497782 A, a solution consisting of polyacrylic acid, polyacrylamide, surfactants and water is used. This agent can be used as protection against freezing and for binding dust in a way similar to that of the agent from the patent CN 101824303 by spraying it on the surface.

In the patent CN 101333431, modified melamine formaldehyde compounds are used for the purpose of binding dust and fixing sand.

In the patent CN 102093846, agents are used, which contain polyvinyl alcohol, guar gum, a microbiocide and water for controlling dust when loading phosphate ores. The patent CN 102093847 discloses a composition for suppressing the formation of dust while processing iron ores. According to this patent, this polymeric compound consists of 1 to 10% by weight of butadiene-styrene copolymers, 0.5 to 5% by weight of water-soluble sodium carboxymethylcellulose, polyvinyl alcohol, modified starch or polyacrylamide. Furthermore, sodium dodecylbenzene sulfonate and coconut fatty acid diethanolamide are contained as surface active agents.

Many agents, described in the prior art, contain toxic substances, such as boric acid, acrylamide (as residual monomer) or coal tar or are ecologically questionable because they contain, for example, surfactants, mineral oil, distillation residues or fluorine-containing polymers. Or special polymers are prepared with great effort; however, these polymers frequently are very expensive for dust control purposes.

The objective therefore was to find economically and ecologically favorable dust control agents, which, at the same time, are
- effective, safe and have manifold uses,
- are not toxic to the environment,
- do not contain phosphorus or halogen,
- do not contain surfactants,
- are based at least partially on raw materials, which can be regenerated, and
- can be produced at a reasonable price.

The disadvantages, portrayed above, can be eliminated by the dust control agent of the invention, which is polymer dispersion. This agent totally fulfils the requirements mentioned above.

It should also be mentioned that this class of compounds is also used for the production of paper and cardboard, for example, as a surface gluing agent and, depending on the monomer composition, is approved for papers in contact with foods in accordance with the recommendation XXXVI of the BfR (Federal Institute for Risk Evaluation).

The dust control agent, used in accordance with the invention, is a polymer dispersion, which may be obtained by the free radical-initiated emulsion polymerization of the components a to e, wherein
a. 2 to 75% by weight of styrene and/or substituted styrene, and
b. 0 to 75% by weight of C1 to C12 esters of acrylic acid and/or C1 to C12 esters of methacrylic acid, and
c. 0 to 50% by weight of acrylonitrile/or methacrylonitrile, and
d. 0 to 50% by weight of at least one further copolymerizable, ethylenically unsaturated monomer with one or more carbon-carbon double bonds, in the presence of
e. 10 to 75% by weight of starch and/or modified starch and/or degraded starch and/or degraded, modified starch are polymerized in water, the sum of a+b+c+d+e being 100% by weight and the ratio by weight of water to the sum of the parts by weight of a+b+c+d+e being between 99:1 and 40:60,
the monomers in group d with more than one double bond being selected from methylene bisacrylamide, polyalkylene glycol di(meth)acrylates and triallylamine.

As monomers of group a, styrene, as well as substituted styrenes such as α-methylstyrenes, or also C1 to C4 alkyl-substituted styrenes, such as vinyl toluene, also come into consideration. Preferably, styrene is used. Group b includes the acrylate and/or methacrylate esters, such a methyl acrylate, methyl methacrylate, ethyl acrylate, ethyl methacrylate, n-propyl acrylate, isopropyl acrylate, n-butyl methacrylate, n-butyl acrylate, isobutyl methacrylate, t-butyl acrylate and isobutyl acrylate. However, higher derivatives, such as n-pentyl acrylate, n-pentyl methacrylate, neopentyl acrylate, cyclohexyl acrylate, cyclohexyl methacrylate, 2-hexyl acrylate, 2-hexyl methacrylate, 2-ethylhexyl acrylate, 2-ethylhexyl methacrylate, n-octyl acrylate, n-octyl methacrylate, isooctyl acrylate, isooctyl methacrylate, n-dodecyl acrylate, n-dodecyl methacrylate, dodecyl acrylate, dodecyl methacrylate, may also be used. The use of C1 to C4 esters of acrylic acid and/or methacrylic acid is preferred and the use of n-butyl acrylate and/or t-butyl acrylate and/or methyl methacrylate is particularly preferred.

Acrylonitrile and/or methacrylonitrile are suitable as monomers of group c.

All monomers, which are different from those of a, b and c, are suitable as monomers of group d. For example, acrylic acid, methacrylic acid, acrylamide, methacrylamide, vinyl acetate, vinyl propionate, N-vinylpyrrolidone, N-vinylimidazole, N-vinylformamide, hydroxyethyl acrylate and hydroxylethyl methacrylate are suitable. Moreover, monomers such as dialkylaminoethyl acrylate, dialkylaminoethyl methacrylate, dialkylaminoalkyl (meth)acrylate, dialkylaminoalkyl (meth)acrylamides, dimethylaminopropyl (meth) acrylate, etc. may also be used. Furthermore, quaternized monomers, such as trimethylammonium methyl methacrylate chloride can also be used. Group d also includes those monomers, which contain more than one carbon to carbon double bond, aside from butadiene, which finds use as a cross-linking agent. Preferably, these comprise methylene bisacrylamide, polyalkylene glycol di(meth)acrylates or triallylamine. Which monomer is used depends essentially on the desired functionality, the availability and the price.

The monomers are polymerized in water in the presence of starch, the preferred molecular weight of which is between 1000 and 50,000 D.

The starch comprises all types of starch such as corn, tapioca, potato, wheat, rice, sorghum starch etc.

The starches may be modified nonionically and/or anionically and/or cationically, esterified and/or etherified and/or cross-linked. Degraded native or modified starches are preferred, the degradation taking place preferably before the polymerization. The starches may be degraded, for example, oxidatively, thermally or enzymatically. Mixtures of all the above-named starches may also be used, provided that they are compatible. The proportion of starch with respect to the monomers a to d preferably is between 20 and 500% by weight. The solids content of the aqueous polymer dispersion preferably is more than 10% by weight and particularly more than 25% by weight, and the viscosity preferably is less than 1000 mPas and especially preferred less than 500 mPas. The average size of the dispersed particles is preferably less than 1000 nm and especially preferred less than 500 nm.

The emulsion polymerization, initiated by free radicals, takes place according to methods of the prior art by using appropriate initiators, optionally in the presence of controllers. The rules, which apply for emulsion polymerization of the prior art, are not listed explicitly in the following, but do apply analogously within the scope of this invention.

Spraying with the help of mobile spraying equipment comes into consideration as a significant method for applying the agent on dusty surfaces of all types; with this method, the agent can be applied finely dispersed and homogeneously on the surfaces. It is important that the agent for covering the surfaces can be applied sparingly. For this reason, it is of advantage that the polymer dispersion, which, for ecological and economic reasons, is produced and sold as a concentrate, has a low viscosity at high solids content and can be diluted on site without problems.

The following possible uses are not limiting or exhaustive and the use on any type of dusty surface is conceivable. However, the following are named by way of example: coal, coke, ore, metal dust, sand, soil, ash, minerals, sulfur, slag, fertilizer or garbage, unsealed roads, open-cut mines, quarries, industrial storage areas, areas used for agriculture and forestry, dust control on helicopter landing areas and service sites, aerodromes, transport of dust on open trucks, railroad carriages or ships, dust control during the demolition of buildings and playing fields, such as tennis courts, golf links, racecourses and racing tracks.

The following examples explain the preparation of the dust control agents, which are used in accordance with the invention.

Preparation of dust controlling agents used in accordance with the invention.

EXAMPLE 1

Perglutin A 288 (a copolymer of styrene and acrylate, grafted with starch, from BK-Giulini GmbH).

EXAMPLE 2

In a 1 L Quickfit flask with stirrer, reflux condenser and jacket heating, 87 g of cationized potato starch (DS approximately 0.07; Emcat C60 from Emsland Stärke) are dispersed in 578.5 g of decarbonated water.

While stirring, 6 g of an 8.3% solution of calcium acetate, 6.0 mg of copper sulfate pentahydrate, dissolved in 7.5 g of decarbonated water and then 20 g of 15% sodium per sulfate solution are added.

After the addition, the mixture is heated to 80° C. and stirred for 30 minutes at this temperature, a clear to slightly cloudy starch solution being obtained.

After the addition of 200 mg of silicone defoamer with 1 g of decarbonated water, the monomer and the initiator are added at an internal temperature of approximately 83° C.

The monomer consists of a mixture of 189 g of styrene and 47.4 g of n-butyl acrylate and it is added uniformly over a period of 240 minutes.

As initiator, 49.725 g of a 10.6% hydrogen peroxide solution is added over a period of 255 minutes.

After the monomer has been added, the feed line is flushed with 9.055 g of decarbonated water.

When the initiator has been added, 60 mg of ferrous sulfate, dissolved in 3 g of decarbonated water, are added.

After stirring for 10 minutes, 0.5 g of t-butyl hydroperoxide solution (70% in water) are added and stirring is continued for 1 hour at 83° C., after which the reaction mixture is cooled.

Glutardialdehyde solution (1 g of a 24% solution) is added as a preservative.

After filtration through a 100 μm screen, a dispersion is obtained with a solids content of 31.4%.

The dispersion obtained has a viscosity of 10 mPa*s (Brookfield LV spindle 1, 60 RPM) and a pH of 2.

EXAMPLE 3

Oxidatively degraded potato starch (285 g, Amylex 15 from the Südstärke company) is dispersed in 404.72 g of decarbonated water in a 1 L Quickfit flask with stirrer, reflux condenser and jacket heater.

While stirring, 0.07 g of an amylase (Multifect AA18L from the Genencor company), diluted with 5.21 g of decarbonated water, is added.

At the end of the addition, the mixture is heated over a period of 1 hour to 55° C. and then, over a period of 20 minutes, to 75° C. Stirring at this temperature is continued for 2 hours, a clear to slightly cloudy starch solution being obtained.

After the addition of 500 mg of formaldehyde solution (35%), the internal temperature is raised over a period of 30 minutes to about 90° C.

After the addition of 2.75 g of sodium sulfate, dissolved in 6.2 g of decarbonated water, the addition of the monomers, consisting of a mixture of 40.5 g of styrene and 0.9 g of acrylic acid, is commenced.

These are added uniformly over a period of 40 minutes.

At the end of the addition, stirring is continued for a further hour before 0.85 g of sodium formaldehyde sulfoxylate (Rongalit C) in 5 g of decarbonated water is added.

At the same time, 135 g of styrene and 5 g of trimethyl ammonium methyl methacrylate chloride (75%), dissolved in 20 g of decarbonated water, are added over a period of 120 minutes. At the same time, the addition of 42 g of a 12% hydrogen peroxide solution over a period of 240 minutes as initiator is commenced.

After the monomer has been added, the feed line is flushed with 5 g of decarbonated water. After the initiator has been added, the reaction solution is stripped for 30 minutes at about 90° C., then supplemented with 8.5 g of decarbonated water and cooled to 30° C. The pH is adjusted with sodium hydroxide solution to approximately 4, and excess hydrogen peroxide is decomposed by the addition of sodium bisulfite solution. Subsequently, 1 g of Synperonic T701, 1g formaldehyde solution (35%) and 0.5 g of glutardialdehyde solution (24%) are added. After filtration through a 100 μm screen, a dispersion is obtained with a solids content of 44.2%.

The dispersion obtained has a viscosity of 210 mPa*s (Brookfield LV spindle 2, 60 RPM) and a pH of 4.

EXAMPLE 4

In a 1 L Quickfit flask with stirrer, reflux condenser and jacket heating, 60 g of native potato starch from the Südstärke company are dispersed in 595 g of decarbonated water.

While stirring, 12 g of a 4.2% calcium acetate solution, 60 mg of copper sulfate pentahydrate, dissolved in 7.5 g of decarbonated water and then 3 g of hydrogen peroxide (30%) are added.

After the addition, the mixture is heated to 80° C. and stirred for 30 minutes at this temperature, a clear to slightly cloudy starch solution being obtained.

After the addition of 200 mg of silicone defoamer with 1 g of decarbonated water, the addition of the monomer and the initiator is commenced at an internal temperature of approximately 83° C.

The monomer additions consist of:
a) a mixture of 118.2 g of styrene, 59.1 g of n-butyl acrylate, 59.1 g of t-butyl acrylate and 1 g of acrylic acid,
b) a mixture of 7.5 g of trimethylammonium methyl methacrylate chloride (75%) with 12.5 g of decarbonated water.

As initiator, 49.725 g of a 10.6% hydrogen peroxide solution are added over a period of 255 minutes.

After the monomer has been added, the feed lines are flushed with 10.075 g of decarbonated water.

When the initiator has been added, 60 mg of ferrous sulfate, dissolved in 3 g of decarbonated water, are added and stirred for a further hour at approximately 83° C.

After cooling to 30° C., glutardialdehyde (1 g of a 24% solution) is added as a preservative.

After filtration through a 100 μm screen, a dispersion is obtained with a solids content of 29.9%.

The dispersion obtained has a viscosity of 27 mPa*s (Brookfield LV spindle 1, 60 RPM) and a pH of 2.8.

There are several possibilities for applying the inventive dust control agent. Before use, the polymer dispersion can be diluted with water, a solution/dispersion of defined concentration being obtained, which can then be sprayed in batches. However, with the help of a Venturi valve or a static mixer or a different suitable component, the polymer may also be mixed continuously into the flowing water, which is to be sprayed.

For controlling the dust while transporting dusty solids or substrates on conveyor belts, the aqueous dispersion is applied continuously onto the transported material by spray nozzles. In this connection, the spray nozzles may be above a longer section of the conveyor belt, or at a transfer point, at which the substrate falls from one conveyor belt to a lower one or onto the ground or the storage endpoint.

For controlling dust on unsealed roads, for example in open-cut mines, quarries, industrial storage areas, areas used for agriculture and forestry, sports facilities, helicopter landing areas or aerodromes, etc., the dispersion is sprayed onto the surfaces with the help of a traveling tanker, which is provided with spraying equipment. This listing is not limiting and any type of surface of dusty solids can be treated with the inventive dust control agent.

The following examples describe the most important types of use:

EXAMPLE 5

Use of the Dust Control Agent Prepared According to Example 1

A dry pile of coal with a high proportion of dust was sprayed with 2 L/m² of a 5% by volume aqueous dispersion of Example 1 and allowed to dry overnight. A further pile is treated only with water. After about 12 hours, the wind resistance of the pile was tested by means of a conventional commercial hairdryer in that the latter was set at the highest setting and held for 30 seconds approximately 1 cm from the pile, different orientations (wind directions) being covered. The pile, treated with the agent of Example 1, remained stable and there were no significant emissions of dust. On the other hand, the pile, which was treated only with water, was blown away completely. The efficiency of the treatment (dust reduction) was better than 99%.

The mechanical stability of the covering layer was determined by pressing the pile manually from different orientations. In contrast to the pile, which had been treated only with water, the pile, treated with the agent from Example 1, had a significant mechanical stability, a crust, several millimeters thick, having been formed. The water-repelling action of the covering layer was then tested at a still undamaged site of the crust by allowing small water droplets to fall on it. In comparison to the pile treated only with water, the one treated with the agent from Example 1 had an increased water-repelling action.

EXAMPLE 6

As in example 5, sea sand was now used as substrate. Efficiency of the treatment: >99%

EXAMPLE 7

As in example 5, crude phosphate was now used as substrate.
Efficiency of the treatment: >75%

EXAMPLE 8

Large-Scale Field Trial

A crude phosphate storage area, approximately 30 m long, 5 m wide and 4 m high, was treated. Mobile spraying equipment, model "Dust Boss DB 30" of the DeDusting Technology company (Waldkirch, Germany) was used as application equipment. The agent from Example 1 was mixed continuously in an amount of approximately 5% with the sprayed stream of water with the help of a mechanical proportional pump. The Dustboss was set to swivelling mode and, taking into consideration the direction of the wind, adjusted so that an area of approximately 30 to 40 m² was sprayed with a dosage of approximately 2 L/m² at one location. After a drying time of approximately 3 hours, the surface was examined. It was noted that the surface had consolidated to a depth of several millimetres. Under the given weather conditions (moderate wind), no dust emissions were observed.

As in Example 5, the following experiments were conducted with the dust control agents from Examples 2 to 4:

TABLE 1

| Example | Dust Control Agent | Substrate | Effiziency |
|---|---|---|---|
| Example 9 | From Example 2 | Sea sand | 90% |
| Example 10 | From Example 3 | Sea sand | 90% |
| Example 11 | From Example 4 | Sea sand | 75% |
| Exampel 12 | From Example 2 | Coal | >99% |
| Example 13 | From Example 3 | Coal | >99% |
| Example 14 | From Example 4 | Coal | >99% |

The invention claimed is:
1. A method of controlling dust comprising: applying to a substrate, which is to be treated, a polymer dispersion as a dust control agent, wherein the polymer dispersion is prepared by free radical initiated emulsion polymerization of:
   a. 2 to 75% by weight of styrene and/or substituted styrene,
   b. 0 to 75% by weight of C1 to C12 esters of acrylic acid and/or C1 to C12 esters of methacrylic acid,
   c. 0 to 50% by weight of acrylonitrile and/or methacrylonitrile;
   d. 0 to 50% by weight of at least one further copolymerizable, ethylenically un-saturated monomer with one or more carbon-carbon double bonds, and
   e. 10 to 75% by weight of starch and/or modified starch and/or degraded starch and/or degraded modified starch;
   wherein components a to e are polymerized in water, the sum of a+b+c+d+e being 100% by weight and the ratio of water to the sum of components a to e being 99:1 to 40:60 by weight; and
   wherein, when the monomer in group d has more than one carbon-carbon double bond, the monomer is selected from the group consisting of methylene bisacrylamide, polyalkylene glycol di(meth)acrylates, and triallylamine.

2. The method of claim 1, wherein the substrate, which is to be treated, is any type of dusting solid.

3. The method of claim 1, wherein the concentration of the aqueous dispersion is 0.5 to 3% when applied.

4. The method of claim 1, wherein the polymer dispersion dust control agent is applied in an amount of 0.2 to 3 L per m² of the surface to be treated.

5. The method of claim 1, wherein the polymer dispersion has a solids content of at least 10% by weight, a viscosity of not more than 1000 mPas and a pH of 1 to 11, and the average size of the polymer particles is less than 1 μm.

6. The method of claim 1, wherein component a is styrene, and this is optionally used in combination with n-butyl acrylate and/or t-butyl acrylate and/or acrylonitrile and/or acrylic acid as monomers b to d.

7. The method of claim 1, wherein a degraded native and/or a degraded modified starch with a molecular weight of 1000 to 50,000 D is used as starch.

8. The method of claim 1, wherein the proportion of starch to the monomers a to d is 20% to 500% by weight.

9. The method of claim 5, wherein the polymer dispersion has a pH of 2 to 9.

10. The method of claim 1, wherein the polymer dispersion is in the form of an aqueous dispersion and applying comprises homogenously spraying the aqueous dispersion onto the surface of or into a substrate which is to be treated.

* * * * *

UNITED STATES PATENT AND TRADEMARK OFFICE
CERTIFICATE OF CORRECTION

| | |
|---|---|
| PATENT NO. | : 9,803,121 B2 |
| APPLICATION NO. | : 14/395262 |
| DATED | : October 31, 2017 |
| INVENTOR(S) | : Michael Urschey et al. |

It is certified that error appears in the above-identified patent and that said Letters Patent is hereby corrected as shown below:

On the Title Page

Item (71), please replace the Applicant name with the following:
KURITA WATER INDUSTRIES LTD., Tokyo (JP)

Signed and Sealed this
Twenty-seventh Day of February, 2018

Andrei Iancu
*Director of the United States Patent and Trademark Office*